Nov. 28, 1961   H. COGGER   3,010,771
BEARING ASSEMBLY
Filed July 13, 1959

INVENTOR.
HOWARD COGGER
BY
Robert A. Sloman
ATTORNEY

United States Patent Office 3,010,771
Patented Nov. 28, 1961

3,010,771
BEARING ASSEMBLY
Howard Cogger, Livonia, Mich., assignor to Acme Ball Bearing & Mfg. Co., Detroit, Mich., a corporation of Michigan
Filed July 13, 1959, Ser. No. 826,742
8 Claims. (Cl. 308—187.2)

This application is a continuation in part of my copending patent application 677,641 filed August 12, 1957, now Patent No. 2,916,335, relating to a bearing assembly.

This invention relates to ball bearings and rollers, and more particularly to ball bearing assemblies adapted for use in conjunction with various mechanisms such as conveyors, trolleys, wheels and rollers such as might be used with conveyor chains, or other mobile devices.

Heretofore in ball bearing construction, various means have been provided for sealing off their lubricated interiors, none of which have been completely successful in preventing the entry of dirt, dust and moisture, with the result of rusting so that the ball bearing life is greatly reduced.

In the construction of the ball bearings as assembled into a wheel or roller at least one side, and sometimes both sides of the bearing adjacent the axle or support are partly open.

The present invention has for its primary object a novel form of flexible oil seal retainer which is immovably secured upon the relatively stationary shank of the inner race, retainingly engages the felt or other seal and includes an outer annular surface portion adapted for continuous surface contact with a rotatable closure plate or retainer mounted on the outer race.

It is the further object herein to provide a novel resilient seal retainer immovably secured upon the inner ball race of the bearing, loosely nested within the relatively rotatable outer race, and with an outer annular radial portion of the flexible retainer in sweeping surface contact with a corresponding inner annular surface of a second retainer disc loosely positioned with respect to the inner race and retained within the outer race for movement therewith.

It is another object herein to provide the flexible retainer of one metal and the relatively movable retainer disc of a different metal whereby surface contact between the two members will result in a minimum of friction.

It is another object hereof to provide one of said retainers of a non-ferrous metal and the other of a ferrous metal for the purpose of effecting an efficient seal between the two relatively movable members and for minimizing friction.

It is still a further object to provide the inner flexible seal retainer disc of a brass or bronze, or the equivalent and to provide the outer retainer disc of relatively rigid steel.

It is another object to provide a bearing or wheel or roller assembly wherein the inner race includes shanks projecting through both sides of the outer race axially thereof and wherein both of the open sides of the outer race are sealed against the admission of dirt or moisture by the use of pairs of said flexible and non-flexible discs arranged upon opposite sides of the outer race.

It is another object herein to incorporate this structure into a roller utilizing two or more sets of ball bearings such as might be employed in a conveyor chain, for example.

It is another object to provide a permanent sealed bearing which effectively retains lubricant therein wherein an extremely low co-efficient of friction is present and wherein the bearing is resistant to high heat and is self-compensating for wear.

It is a further object to provide a sealed bearing forming a part of a roller assembly employing a low friction plastic such as Teflon and incorporating a centrally apertured flexible diaphragm of spring bronze so other non-ferrous metal, which is peripherally secured within the outer race and with inner annular surface portions sealingly engaging the plastic or Teflon washer.

It is a further object to include as a part of the sealed bearing a retainer disc carried by the outer bearing race which cooperatively and retainingly engages outer surface portions of the flexible diaphragm and wherein the inner annular edge of the retainer disc loosely surrounds the inner bearing race.

It is another object to provide a sealed bearing incorporating a resilient non-ferrous sealed retainer secured within the outer ball race and including an inner annular surface portion in sweeping sealing contact with a corresponding inner annular surface of an oil seal Teflon washer for effectively sealing an interior of the bearing from the exterior.

These and other objects will be seen from the following specification and claims in conjunction with the appended drawing in which:

It will be understood that the above drawing illustrates merely several preferred embodiments of the invention and that other embodiments are contemplated within the scope of the claims hereafter set forth.

Figure 1:
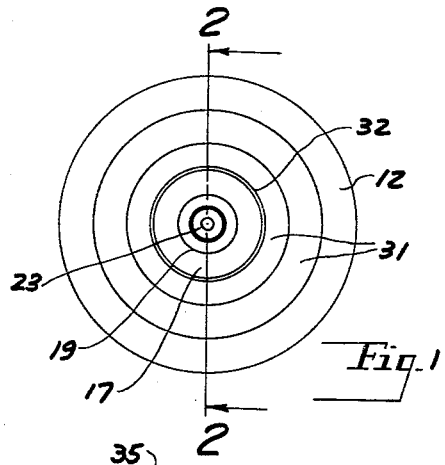
FIG. 1 is a front elevational view of one form of the present ball bearing.
Figure 2:
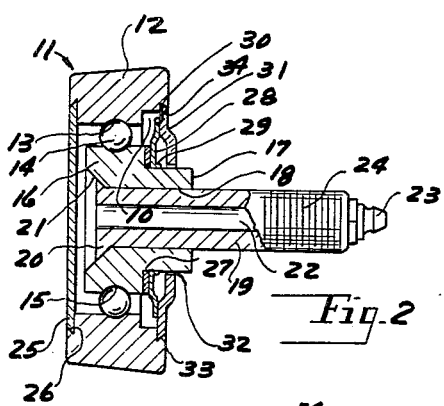
FIG. 2 is a vertical section taken on line 2—2 of FIG. 1.

Referring to FIGS. 1 and 2 there is shown the ball bearing 11 which includes outer race 12 in the form of a wheel having an inner annular groove 13 to cooperatively receive a circular row of spaced balls 14. These balls are supported within the annular groove 15 upon the exterior of the inner bearing race 16. A conventional ball retainer is used but is omitted from the drawing.

The inner race is loosely nested within outer race 12, is centrally apertured and includes the outwardly projecting circular shank 17 of reduced diameter, whose bore 18 is adapted to snugly and tightly receive mounting spindle 19. Said spindle includes tapered enlarged head 20 which cooperatively nests within the countersunk aperture 21 upon one side of race 16.

Spindle 19 has an axial bore 22 whose inner end communicates with the interior of outer race 12, and whose opposite end terminates in the grease fitting 23. Said spindle is exteriorly threaded at 24 to provide a means of fixedly mounting inner race 16 upon a suitable support, such as the support bracket of a conveyor assembly for illustration.

In the present embodiment, FIG. 2, one end of the outer race is closed. This is accomplished in the present illustration by the disc or dust plate 25 whose tapered annular edge is nested and retained within a correspondingly tapered undercut recess 26 formed within one end of race 12.

Shank 17 as a reduced extenison of race 16 provides therewith an abutment shoulder against which the annular seal, such as a felt seal 27 is positioned, said seal snugly extending around shank 17.

Flexible disc 28 preferably constructed of a non-ferrous metal such as brass or bronze or the like, includes the centrally apertured flange 29 which is tightly pressed or otherwise secured upon shank 17 being so positioned as to retainingly engage felt seal 27.

Said flexible disc has an outer radial and annular flat wall portion 30 positioned loosely within the central chamber 10 of outer race 12. Bearing assembly is completed by the retainer disc 31 which is centrally apertured at 32 for loose positioning axially over shank 17.

The disc 31 is preferably constructed of a ferrous metal such as steel and is suitably secured within the body of race 12 at the end thereof opposite from closure plate 25. For this purpose disc 31 includes the tapered edge 33 which is retainingly nested within the undercut similarly tapered annular slot 34 formed upon the interior surface of race 12.

When the retainer disc 31 is in the position shown in FIG. 2, an annular and radial inner surface portion thereof is in sweeping and sliding contact with the corresponding annular radial edge 30 of flexible disc 28. The continuous peripheral surface contact of disc 28 with relatively rotatable disc 31 effectively seals off the interior chamber 10 on said outer race from exterior dirt and moisture. This is particularly beneficial in view of the required clearance space 32 between shank 17 and relatively rotatable disc 31, which otherwise would permit entrance of dirt and moisture to the interior of the bearing assembly.

Figure 3:
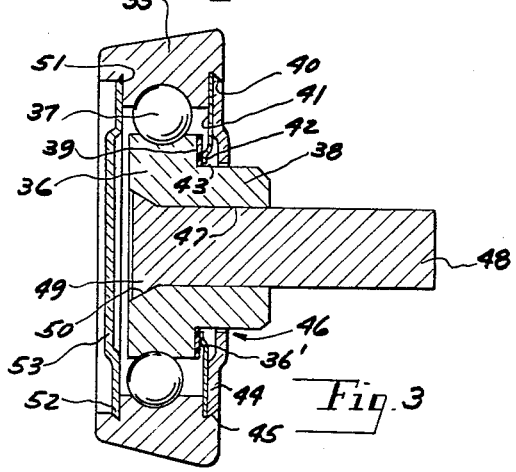
FIG. 3 is a similar view of a ball bearing or roller, as a variation of the structure shown in FIG. 2.

FIG. 3 illustrates another form of the invention wherein there is provided a permanently sealed bearing. This ball bearing includes outer race 35 in the form of a tapered wheel having an inner annular groove to cooperatively receive a circular row of spaced balls 37. These balls engage within a corresponding annular groove upon the exterior of inner bearing race 36. A conventional ball retainer is employed, but is omitted from the drawing for clarity.

Inner race 36 is loosely nested within outer race 35 and includes the reduced diameter circular shank 38 which projects laterally outward of outer race 35. Shank 38 defines with race 36 the annular retainer shoulder 36' against which is positioned annular lubricant seal or washer 39, preferably constructed of a suitable plastic material such as Teflon, but without excluding other low friction materials or fibres.

Within the undercut annular tapered groove 40 adjacent one side of outer race 35, there is nested the outer annular tapered edge of circular flexible diaphragm or disc 41, preferably of a non-ferrous material, such as spring bronze. Said diaphragm is centrally apertured at 43 to loosely receive shank 38, and includes an inner annular surface portion 42 which slidably and cooperatively engages an outer annular surface of plastic washer or lubricant retainer 39. Thus in spite of the clearance space 46, the interior of race 35 is sealed from the exterior.

Formed annular retainer disc 44 has a tapered peripheral edge 45 retainingly nested within undercut groove 40 in outer race 35 and is fixedly secured therein.

Inner annular surface portions of retainer disc 44 cooperatively and retainingly engage outer surface portions of the flexible diaphragm disc 41. Retainer disc 44 is centrally apertured at 46 to loosely receive shank 38. The inner annular edge 42 of diaphragm 41 flexibly and slidably engages lubricant retainer, washer 39.

Inner race 36 and its shank has a central bore 47 adapted to snugly and tightly receive mounting spindle 48, or any other support. Said spindle includes the tapered enlarged head 49 which cooperatively nests within tapered countersunk aperture 50 upon one side of inner race 36.

Additional undercut tapered groove 51 is also formed adjacent and inwardly of the other side of outer race 35. Annular disc or dustplate 53 includes a corresponding tapered peripheral edge 52 snugly and retainingly nested within undercut groove 51 completing the seal and assembly of the bearing shown in FIG. 3.

Grease seal or lubricant retainer 39 is preferably of Teflon, which is a tetrafluoroethylene resin. Teflon is chemically inert, being insoluble in and unaffected by all known solvents and is universally resistant to chemical agents. It is attacked only by alkali metals and by fluorine under specific conditions.

Teflon is heat and weather resistant, and will give continuous service at 500° F. with no adverse effects. Exposure to all climatic conditions for periods up to ten years show no effect on the properties of Teflon. It has a low co-efficient of friction i.e., .016 to .024 against polished steel; and is particularly adaptable for bearing surfaces.

Teflon is tough and flexible, and these characteristics are retained over a wide range of temperatures, being just as serviceable at sub-zero as well as at normal and at high temperatures. Teflon does not absorb moisture.

In view of these characteristics, it has been found that the use of the Teflon lubricant retainer produces a better lubricant retainer and is cooperatively engaged by the present flexible sealing diaphragm with a very minimum of friction.

Flexible diaphragm 41 is preferably of a non-ferrous metal, such as spring bronze. Whereas the coefficient of friction between bronze and steel, as in FIG. 2 is approximately .500; the coefficient of friction between the spring bronze diaphragm 41 and the Teflon retainer 39 is approximately .024. This is 21 times less friction.

While bronze is preferred, it is contemplated that the diaphragm may be constructed of other non-ferrous metals or may be made of stainless steel. Here also there is a similar very low coefficient of friction with respect to the Teflon retainer; and consequently the very minimum of wear. Thus the bearing assembly of FIGS. 3—4 is permanently sealed and need never be re-lubricated once assembled.

Figure 4:
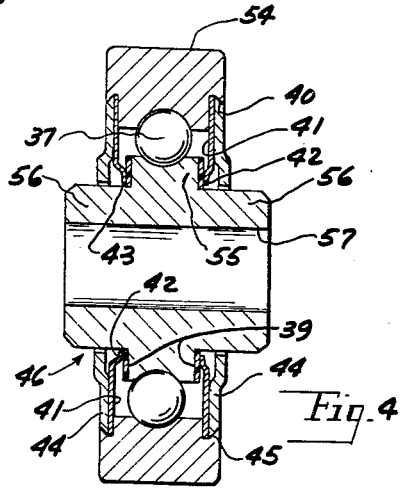
FIG. 4 is a similar view of still another variation thereof.

This has the following advantages for a permanent sealed bearing:

(1) Eliminates greasing equipment
(2) Reduced maintenance expense
(3) Eliminates lubricant leak
(4) Increases the life of the equipment
(5) Uses less lubricant
(6) Compensates for wear A slight variation is shown in FIG. 4 wherein inner bearing race 55 includes oppositely extending shanks 56 of reduced diameter projecting from opposite sides of outer bearing race 54.

Corresponding annular grooves are formed within the inner and outer races to cooperatively receive the circular row of spaced balls 37. These are normally held by a suitable retainer in spaced relation. The retainer is omitted from the drawing, being purely conventional in construction.

Inner race 55 and its shanks 56 have a central bore 57 providing a means of mounting upon a suitable support or spindle as desired. Outer race 54 upon its opposite sides has a pair of tapered undercut grooves 40 within each of which outer peripheral portions of flexible diaphragm 41 and retainer disc 44 are positioned in the same manner as above described with respect to FIG. 3.

There is also provided in this case a pair of grease retainers or plastic washers 39, the same as in FIG. 3 mounted on shanks 56 and whose annular surface portions abut inner race 55.

Here also the inner annular edge portions 42 of the flexible diaphragms respectively engage annular surface portions of the Teflon washers 39.

Figure 5:
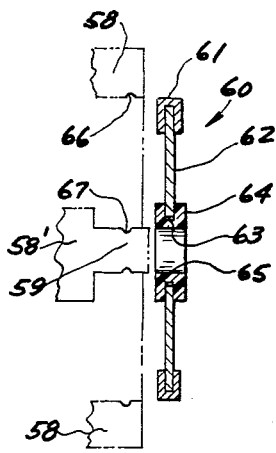
FIG. 5 is a fragmentary vertical section of a sealing cartridge assembly adapted for projection into a ball bearing.
Figure 6:
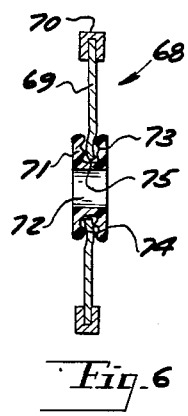
FIG. 6 is a similar view of a slight variation thereof.
Figure 7:
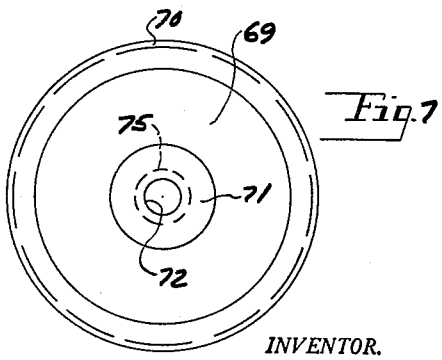
FIG. 7 is a side elevational view of FIG. 6.

FIGS. 5, 6, and 7 relate to a seal package assembly 60 for bearings such as the bearing fragmentarily shown in FIG. 5. Said bearing is similar to the bearing assembly of FIG. 3 and includes outer race 58, and the inner race 58' with reduced annular shank 59.

The present seal package includes annular metallic channel 61, preferably of steel, peripherally secured upon the outer edge of flexible diaphragm 62, preferably made of spring bronze. Diaphragm 62 is centrally apertured at 63 and its inner annular edge is loosely and cooperatively nested within channel ring 64 preferably of a suitable plastic material such as Teflon.

Channel 64 has a central bore 65 adapted to be positioned around shank 59 of inner race 58' at the same time as the outer channel 61 is frictionally projected into outer race 58, FIG. 5, for effectively sealing off the interior of race 58.

The Teflon channel with respect to the spring bronze diaphragm has a coefficient of friction of approximately .024 and is heat resistant up to 500° F. Accordingly the complete assembly provides an attachable seal for an existing bearing where there will be a minimum of wear and a long life; and wherein the package seal rotates with the outer race and the inner peripheral portion of diaphragm 62 is cooperatively and loosely received within Teflon channel 64 for effectively sealing the bearing when assembled therein.

To further secure the package seal assembly within the bearing fragmentarily shown, grooves or undercuts 66—67 of the desired shape are formed within the internal surface of the outer race and the exterior surface of the inner race for cooperation respectively with channel 61 and channel ring 64.

The package seal assembly 68 of FIGS. 6 and 7 is the same as in FIG. 5, except that the flexible diaphragm 69 at its inner edge is slightly curved or corrugated at 74 and is loosely received by the plastic, preferably Teflon channel ring 71 whose corresponding inner surface is similarly corrugated at 73. The peripheral edge of diaphragm 69 has secured thereon the outer channel 70 completing the assembly.

Having described my invention, reference should now be had to the following claims.

I claim:

1. A package seal for bearings having inner and outer races, with the inner race including a reduced shank, a flexible centrally apertured diaphragm disc, a metal channel peripherally secured around said disc, and a centrally apertured plastic channel ring loosely mounted upon and retainingly receiving inner annular edge portions of said diaphragm, said metal channel and channel ring adapted for projection and securing respectively within said outer race and over said inner race shank.

2. In the package seal of claim 1, said diaphragm being constructed of non-ferrous metal.

3. In the package seal of claim 1, said diaphragm being constructed of spring bronze.

4. In the package seal of claim 1, said diaphragm being constructed of spring bronze, said channel ring being constructed of Teflon.

5. In the package seal of claim 1, the interior surface of said channel ring being of irregular form, the corresponding inner surfaces of said diaphragm being of similar form.

6. In a bearing, an outer race, an inner race, including a reduced shank, a flexible centrally apertured diaphragm disc, a metal channel peripherally secured around said disc, and a centrally apertured plastic channel ring loosely mounted on and retainingly receiving inner annular edge portions of said diaphragm, said metal channel and channel ring secured respectively within said outer race and upon said shank.

7. In a ball bearing having an outer race and an inner race with a row of spaced balls interposed therebetween, the combination comprising means for closing one end of said outer race, a shank of reduced diameter on said inner race projecting through the other end of the outer race, an annular plastic grease seal on said shank having side bearing faces extending perpendicular to the axis of rotation of said bearing with one of said side faces disposed against said inner race; a centrally-apertured non-ferrous metal flexible diaphragm peripherally nested and secured within said outer race and including an inner annular bearing surface portion in sliding contact throughout 360° with the other side face of said seal opposite said one side face and intermediate the extremities of said other side face, sealing off said races from dirt and moisture, and a centrally-apertured imperforate retainer disc loosely positioned over said shank, peripherally retained within said outer race and supportedly engaging at least substantially half of said diaphragm extending from said outer race inwardly to an annular locus spaced outwardly of said inner annular bearing surface, said grease seal consisting of a ring member formed of polytetrafluoroethylene and said diaphragm comprises a member consisting of spring bronze.

8. In a ball bearing having an outer race and an inner race with a row of spaced balls interposed therebetween, the combination comprising means for closing one end of said outer race, a shank of reduced diameter on said inner race projecting through the other end of the outer race, an annular plastic grease seal on said shank having side bearing faces extending perpendicular to the axis of rotation of said bearing with one of said side faces disposed against said inner race; a centrally-apertured non-ferrous metal flexible diaphragm peripherally nested and secured within said outer race and including an inner annular bearing surface portion in sliding contact throughout 360° with the other side face of said seal opposite said one side face and intermediate the extremities of said other side face, sealing off said races from dirt and moisture, and a centrally-apertured imperforate retainer disc loosely positioned over said shank, peripherally retained within said outer race and supportedly engaging at least substantially half of said diaphragm extending from said outer race inwardly to an annular locus spaced outwardly of said inner annular bearing surface, said means for closing said one end of said outer race comprising another shank of reduced diameter on said inner race projecting through said one end of the outer race, another annular plastic grease seal on said other shank having side bearing faces extending perpendicular to the axis of rotation of said bearing with one of said side faces of said other seal disposed against said inner race; another centrally-apertured non-ferrous metal flexible diaphragm peripherally nested and secured within said outer race and including another inner annular bearing surface portion in sliding contact throughout 360° with the other side face of said other seal opposite said one side face of said other seal and intermediate the extremities of said other side face of said other seal, sealing off said races from dirt and moisture, and another centrally apertured imperforate retainer disc loosely positioned over said other shank, peripherally retained within said outer race and supportedly engaging at least substantially half of said other diaphragm extending from said outer race inwardly to an annular locus spaced outwardly of said other inner annular bearing surface, said grease seals consisting of ring members formed of polytetrafluoroethylene, and said diaphragms comprising members consisting of spring bronze, and wherein said inner annular bearing surfaces are at least substantially planar.

References Cited in the file of this patent

UNITED STATES PATENTS

| 1,370,861 | Vanderbeek | Mar. 8, 1921 |
| 1,930,312 | Greenhoe | Oct. 10, 1933 |
| 2,277,810 | Zotter | Mar. 31, 1942 |
| 2,298,463 | Burt | Oct. 13, 1942 |
| 2,419,385 | Beier | Apr. 22, 1947 |
| 2,647,808 | Spurgeon | Aug. 4, 1953 |
| 2,654,644 | Sutowski | Oct. 6, 1953 |
| 2,655,392 | Lighthall | Oct. 13, 1953 |
| 2,941,825 | Heinrich | June 21, 1960 |

OTHER REFERENCES

Product Engineering, July 1951, page 200 relied on.